1

3,157,594
METHOD OF FLOCCULATION
Ashley D. Nevers, King of Prussia, Pa., assignor to Pennsalt Chemicals Corporation, Philadelphia, Pa., a corporation of Pennsylvania
No Drawing. Filed Sept. 6, 1963, Ser. No. 306,989
8 Claims. (Cl. 210—52)

This invention relates to the use of starch derivatives obtained by reaction of starch with an N-alkyl methylol triazone, which derivatives are particularly useful as flocculants for turbid water and for use in sewage treatment.

It is known in the art to react starch with numerous active reagents to attach various kinds of substituents to the polymer chain. In many cases the reagent with which the starch is reacted contains a tertiary amino group and the modified starch product thus obtained is frequently referred to in the art as a cationic starch. Such starches have been used as flocculants for a variety of suspensions whose particles carry a negative charge, such as cellulose, clay suspensions, silt in river waters, and aqueous suspensions of particles of ores, coal and carbon. Many flocculants such as synthetic cationic polyelectrolytes, however, have the severe disadvantage of forming gums and such gums result in a blinding or clogging of the filter screens used in sewage treatment. Such clogged screens, of course, result in a very slow rate of filtration and frequently make for an entirely impractical process which cannot be used on an industrial scale.

It has been found, in accord with the process of this invention, that the reaction products of starch with N-lower alkyl methylol triazones are excellent agents for treating turbid waters and when these materials are used as flocculant aids for sewage treatment with ferric chloride and lime they do not form gums with the flocculated product and thereby enable a very high filtration rate to be obtained. Furthermore, the compounds used in the invention are very economical to make and use. Thus, the invention represents an important advance in the arts of sewage treatment and flocculants.

The compounds employed in the invention consist of starch reacted with a methylol triazone having the structure

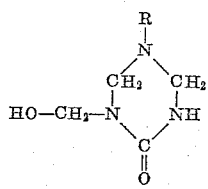

where R is a lower alkyl group; that is, R is methyl, ethyl, propyl, isopropyl, butyl and the like. Such triazones are readily made in accord with prior art techniques by reaction of the appropriate lower alkyl primary amine with urea and formaldehyde (see for example U.S. 2,304,624). Such reactions are normally carried out in aqueous solution and the methylol triazone need not be isolated prior to its reaction with the starch. For subsequent reaction the starch is merely added and the mixture of triazone and starch heated at or below gelatinization temperatures of a period of time ranging from about ½ to about 24 hours. The reaction product is then gelatinized if gelatinization has not already been achieved during the reaction, and the material is recovered by pouring the reaction product solution into methanol and filtering off the insoluble starch derivative which forms. The product recovered in this way is a white, water dispersible powder ready for use.

Any one of a variety of starch materials may be treated with the hydroxymethyl triazone to obtain the modified starches of this invention. Thus, for example, cereal and tuber starches, such as corn, sorghum, wheat, potato and rye are readily reacted with the triazone. Other sources of starch include waxy maize, tapioca, rice, sago and the like. The starch at the time of reaction with the triazone may be in the raw, undegraded state, or it may have been degraded by oxidation, by acid treatment or by heat, to a so-called thin boiling form. The starch may also be treated by other chemical means, either prior to, concurrently with, or subsequent to the reaction, providing the final product is still amylaceous and contains the triazone entity.

The process for preparing the starch derivatives may be carried out either in aqueous or non-aqueous systems (e.g., methanol, ethanol, etc.) at temperatures which will be at or slightly below the starch gelation temperature for the conditions used. The gelation temperature for a particular starch depends, of course, upon its origin, the concentration, presence of additive, etc. The etherification reaction will proceed using either acid or alkaline pH conditions. As already indicated, the methylol alkyl triazone may be prepared first and then reacted with the starch, or, alternatively, the amine, urea and formaldehyde may be added directly and reacted in situ with the starch. When a non-aqueous solvent is used, the reaction product is filtered and washed, then gelatinized by heating in an aqueous system, drowned in alcohol for recovery and dried by standard means. For some uses, the product, prepared in an aqueous system, may be gelatinized and dried directly on a drum dryer to avoid the expense of purification. In still another process for preparing solid, water-dispersible reaction products, a direct etherification process will be used involving the use of a non-aqueous solvent which boils at 105–140° C. In this way, as the reaction proceeds the water formed by the condensation of the hydroxyl group of the methylol radical with the hydroxyl groups of the starch will be carried off in the distillate. The non-aqueous solvent used in this procedure permits an elevated reaction temperature without gelation of the starch. Suitable solvents for this process include the slightly hydrophilic solvents such as ethylene glycol dimethyl ether, dioxane, Cellosolve, carbitol, and the like.

The proportion of methylol triazone and starch used will vary between 1:10 and 1:1 parts by weight of methylol triazone to starch. In this way starch reaction products will be obtained which contain one lower alkyl triazono methyl group per 5 to 500 anhydroglucose units of the starch. Unreacted methylol triazone in the filtrate and washings may be recycled to subsequent reaction batches.

The compounds of the invention are useful for flocculating turbid water and for sewage treatment and they also have value in the paper industry and in those applications where a viscosity stabilized starch is employed. In flocculating turbid water, the alkyl triazono methyl starches of the invention have been found effective when used either alone or as an adjunct to alum, which is a well-recognized primary coagulant. One of the advantages of the starch triazone derivative when used as an adjunct with alum is the improved performance which enables a considerable reduction in alum concentration to be used to obtain equivalent performance. This, of course, results in significant cost savings and the improvement is so large that the reduction in concentration often more than pays for the cost of the alkyl triazono methyl starch employed.

The manner of using the compounds of the invention for flocculating turbid water or for sewage treatment will be in accord with the conventional procedures well known for such treatments and the compounds will be employed in the usual manner at flocculating concentrations.

In accordance with standard treating practice for municipal water treatment, the alkyl triazono starches may be fed to the water stream to be clarified through a continuous proportional mixing device. The starch derivatives may be fed simultaneously with the alum or other inorganic flocculant in aqueous solution or the starch derivatives may be fed independently in a separate stream as desired. A short period of rapid mixing is then followed with a 15–20 minute period of gentle mixing, avoiding turbulence while floc growth occurs. The treated water then passes through settling basins with a detention time of about 2–8 hours for sedimentation of the flocculant solids and clarification of the effluent water. Various modifications of this practice are also compatible with the use of the starch derivatives indicated above. For example, effective clarification may be achieved by first adding the cationic starch flocculant in an amount adequate to neutralize substantially the negative electrical charges on the dispersed solids and then a high molecular weight anionic polymer may be added to form large aggregates of all the previously formed partially neutralized incipient flocs. It is also effective to use the cationic starches of this invention as the sole flocculant or in sequence with an anionic organic flocculant without the use of an inorganic flocculant such as alum or ferric chloride. Standard dosages will vary considerably according to the nature of the water to be treated but will generally fall in the range of 10–200 parts per million. It has been found that when alum is employed at a concentration of about 30 to 60 p.p.m., the triazono starch derivatives are most efficiently used at about 25 to 50 p.p.m. Further information on the usual procedures for water treatment will be found in Kirk-Othmer, Encyclopedia Chemical Technology, 14 Interscience, pp. 953–56.

For sewage treatment, the starch triazone derivatives described above are used primarily as adjuncts to ferric chloride or ferric chloride plus lime. Here too, the reduction in inorganic coagulant made possible by the use of the compounds of this invention effects a cost saving substantially greater than the relatively low cost of the starch derivative. For example, in one application where the compounds of the invention were used, the cost of the added starch derivative of this invention amounted to only 1.5% of the cost of a quantity of ferric chloride which it replaces. And, in addition to this, the system with the alkyl triazono methyl starch gave improved performance. In such use for sewage treatment, the starch triazone derivatives may conveniently be mixed with the aqueous ferric chloride solution in the feed tank prior to treating the sewage with this mixture (and with lime if required). The treated mixture is then fed directly, with only limited agitation, to the tray of a vacuum filter. Alternatively, the starch triazone derivative may be fed separately into the sewage at the same point where the ferric chloride and lime are introduced. The sewage treated in this manner may be raw or it may have been previously processed by any of several treatments well known to those skilled in the art, such as activation, digestion, elutriation, or combinations of these treatments. Further information on the techniques of sewage treatment will be found in the book Sewage Treatment by Imhoff and Fair, 2nd edition, John Wiley & Sons, New York (1956).

EXAMPLES

*Example 1.*—An aqueous solution of methylol ethyl triazone is prepared by gradually adding 64.5 g. of 70% aqueous ethylamine solution (1 mole) to a stirred, externally cooled mixture of 60 g. of urea (1 mole) and 243 g. of 37% formalin (3 moles). The temperature during the amine addition is held below 31° C. and, when the amine is all added, external heat is applied and the mixture held at 60° C. under reflux for 24 hours. The aqueous solution of the resulting product contains 42.6% nonvolatiles, 1.2% free ethylamine and 0.23% formaldehyde.

To 11.9 grams of this solution which contains 5.08 g. of methylol ethyl triazone (.032 mole) there is added 32.4 g. of raw, undried potato starch and the mixture is diluted with water to a total volume of 1 liter. The mixture is then heated on a steam bath for 45 minutes and the resulting gelled product of triazono methyl starch contains 3.84% nitrogen on a dry solids basis. When the product is recovered by methanol drowning, filtration, methanol washing, and drying, the resulting solid material contains 0.20% N, indicating that the original gelatinized reaction mass contains about 95% of the methylol triazone in unreacted form.

The original gelatinized reaction mass is air-dried by mild heating of thin sections applied to sheet steel. The recovered solids are redispersed in water at a concentration of 0.05% for use in flocculation.

*Example 2.*—100 grams corn starch is mixed with 19.3 grams methylol ethyl triazone and 360 ml. diglyme (dimethyl ether of ethylene glycol) is added. The reaction is refluxed for 5 hours, while taking off enough distillate to remove the water from the mass as it is formed. The product is filtered and washed with methanol. It is gelatinized by cooking for about 15 minutes at a temperature between about 75° and 90° C. at a concentration of about 6% in water. The gelled product is recovered by methanol drowning, filtering, methanol washing and drying.

Characterization of the product follows:

Water solubility—semi-dispersible, both gelled and ungelled.

pH of aq. slurry _____ 6–7
pH of gel _____ 7–8
Percent nitrogen (dry solids basis):
    Before gelation _____ 1.0
    After gelling, recovering and drying _____ 0.40

*Example 3.*—1.62 grams of potato starch is mixed with an aqueous solution of 0.25 g. methylol ethyl triazone, diluted with water to 100 ml. and heated in excess of gelation temperature for 30 minutes. The concentrated product, containing 1.87% solids, is diluted to the desired concentration just prior to use.

EVALUATION OF PRODUCTS

*Example 4.*—Flocculation of turbid creek water: 100 ml. portions of turbid creek water were treated with various flocculants in the presence and absence of alum. The following table shows the conditions employed for the test and the results obtained.

*Table 1*

FLOCCULATION OF TURBID CREEK WATER WITH VARIOUS AGENTS

| Agent Added to 100 ml. of Turbid Water | Additive Concentration (parts per million) | Alum Concentration (parts per million) | Flocculating Performance |
|---|---|---|---|
| None | | | No flocculation. |
| Commercial cationic starch ("Flocc-Aid" 1063) | 50 | | Good. |
| Product of Example 1 | 50 | | Do. |
| Commercial cationic starch ("Flocc-Aid" 1063) | 50 | 60 | Very good. |
| Product of Example 1 | 50 | 60 | Excellent—most rapid settling. |

It is readily observed from the above table that the modified starch used in this invention is fully equivalent to other commercial agents when used alone as flocculant. On the other hand, when the modified starch of this invention is used together with alum, a significant improvement in settling time is achieved and this improvement is significantly greater than the commercial product.

*Example 5.*—One hundred ml. portions of raw creek water several days old were tested with (a) 30 p.p.m.

alum; (b) 50 p.p.m. of the triazono starch of Example 2; (c) 30 p.p.m. alum plus 50 p.p.m. of the agent of Example 2. The treated water was observed at several intervals from 10 to 60 minutes and the following was observed.

(1) The alkyl triazono methyl starch of Example 2 (treatment b) gave better clarification than did alum alone in forty minutes.

(2) The triazono starch plus alum (treatment c) gave faster and better ultimate clarification on extended settling time tests (60 minutes or more) than any of the other treatments.

*Example 6.*—This experiment demonstrates the flocculating effect of the recovered dry alkyl triazono methyl starch on clay and compares the effectiveness of said recovered product with (A) the whole gelled reaction mass used directly; (B) unmodified gelled starch; (C) methylol triazone solution which has been held alone for the usual reaction temperature and time used when reacting with starch; and a mixture of (B) and (C), i.e., a physical mixture of gelled starch and methylol triazone, each having been held separately at the usual reaction time and temperature before cooling and mixing.

A gelatinized reaction mass was prepared as in Example 1. A portion of this mass (Additive A) was diluted to 0.1% solids and reserved to be used directly in flocculating tests. Another portion (150 g.) was added slowly to 300 ml. methanol with constant stirring. After settling, the supernatant was decanted and the solids were washed with another 150 ml. of methanol while breaking up lumps with a spatula. The solids were filtered and extracted with methanol for four hours in a Soxhlet apparatus. After drying, a 0.1% dispersion of this product (Additive D) was prepared for flocculating tests.

In a separate procedure, unmodified starch was gelled under the standard time and temperature reaction conditions, and, after cooling, was diluted to 0.1% solids for testing (Additive B).

In another procedure 6 grams of the methylol triazone solution prepared as in Example 1 were added to 500 g. water and were held at the same standard time and temperature before diluting to the use concentration of 0.013% solids (Additive C). This corresponds to the triazone solids which are present in a 0.1% solution of the whole gelled reaction mass.

The flocculating performance of all the above preparations was then measured in settling tests on 100 ml. of a 0.1% dispersion of McNamee clay in stoppered graduated cylinders. The test results follow:

*Table II*

| Additive | Additive Concentration (parts per million) | Sedimentation Rate and Clarity |
|---|---|---|
| None | | (Control.) |
| (A) Whole gelled reaction mass | 10 | Good—better than control. |
| (B) Gelled starch | 10 | Same as control. |
| (C) Heated methylol triazone solution | 10 | Do. |
| (D) Recovered dry solid isolated from (A) | 10 | Good—better than control. |
| (B) plus (C) | 10 | Same as control. |
| (C) plus (D) | 10 | Good—same as (A) and (D). |

When the additive concentrations were increased to 20 p.p.m. the same relative performance was observed for each material with respect to the others.

In another series of tests with McNamee clay, a whole gelled reaction mass prepared as in Example 1 was compared with a commercial cationic starch flocculant. Successive comparisons were made at the 10, 20, and 30 p.p.m. level. The whole gelled reaction mass at 10 p.p.m. resulted in better flocculation than the commercial cationic starch flocculant at 30 p.p.m.

The immediately preceding test series was repeated, but with the addition of 100 p.p.m. lime and 60 p.p.m. alum to each of the test mixtures. Again, the whole gelled reaction mass at 10 p.p.m. solids gave superior flocculation when compared to the commercial cationic starch flocculant at 30 p.p.m.

*Example 7.*—A gelatinized reaction mass was prepared as in Example 1 and diluted to a concentration of 0.1% solids. Raw sewage sludge is treated with the flocculant and flocculant aid combinations listed below and its vacuum filtration performance is tested by the standard Büchner funnel test (see Beck et al., Sewage and Industrial Wastes, 27, June 1955, No. 6).

| Additive System | Percent on Solids | Break Time, Seconds | | |
|---|---|---|---|---|
| | | Initial Break | Filter Paper Curl | Complete Break |
| FeCl₃ | 0.45 | 64 | 69 | 76 |
| Lime | 5.0 | | | |
| FeCl₃ | 0.45 | 46 | 55 | 64 |
| Lime | 5.0 | | | |
| A commercial cationic starch | 1.05×10⁻² | | | |
| FeCl₃ | 0.45 | 71 | 78 | 91 |
| Lime | 5.0 | | | |
| Unmodified starch | 1.05×10⁻² | | | |
| FeCl₃ | 0.45 | 30 | 35 | 40 |
| Lime | 5.0 | | | |
| Triazone methyl starch | 1.05×10⁻² | | | |

It is evident from the above examples that the use of the triazono methyl starch used in accord with this invention significantly reduces filtration time and thus is a significantly superior adjunct for sewage treating procedures.

It will be understood that numerous changes and variations may be made from the above description and examples without departing from the spirit and scope of the invention.

I claim:

1. In the process of treating turbid water, the improvement which comprises adding to said water a flocculating amount of a gelatinized starch derivative obtained by reacting 1 to 10 parts by weight of starch with 1 part by weight of a methylol triazone of structure

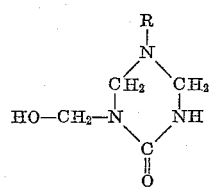

where R is a lower alkyl group.

2. In the process of treating turbid water, the improvement which comprises adding to said water a flocculating amount of a gelatinized starch derivative containing one lower alkyl triazono methyl group per 5 to 500 anhydroglucose units.

3. A process for the clarification of turbid water which comprises the addition to said water from about 30 to about 60 p.p.m. of alum and from about 25 to 50 p.p.m. of a gelatinized starch derivative containing one lower alkyl triazono methyl group per 5 to 500 anhydroglucose units.

4. The process of claim 3 wherein the starch derivative is ethyl triazono methyl starch.

5. In the process of treating turbid water, the improvement which comprises adding to said water a flocculating amount of a gelatinized starch derivative obtained by etherifying 1 to 10 parts by weight of starch with one part by weight of a lower alkyl hydroxymethyl triazone.

6. The process of claim 5 wherein the triazone is ethylhydroxymethyl triazone.

7. In the process of clarifying turbid water, the improvement which comprises the addition to said water of from about 30 to about 60 p.p.m. of alum and from about 25 to about 50 p.p.m. of a gelatinized starch derivative obtained by heating 1 to 10 parts by weight of starch in an aqueous system at a temperature essentially equivalent to the gelation temperature of said starch with one part by weight of ethylhydroxymethyl triazone to effect etherification.

8. In the process of treating sewage with ferric chloride, the improvement which comprises adding as a filtration aid a gelatinized starch derivative containing one lower alkyl triazono group per 5 to 500 anhydroglucose units.

No references cited.